(12) United States Patent
Nakasai et al.

(10) Patent No.: US 6,330,896 B1
(45) Date of Patent: *Dec. 18, 2001

(54) RADIAL-PLY TIRE WITH SPECIFIED BELT STRUCTURE

(75) Inventors: Takashi Nakasai; Junichi Ohashi, both of Hyogo (JP)

(73) Assignee: Toyo Tire & Rubber Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/890,730

(22) Filed: Jul. 11, 1997

Related U.S. Application Data

(63) Continuation of application No. 08/610,795, filed on Mar. 11, 1996, now abandoned, which is a continuation of application No. 08/355,411, filed on Dec. 9, 1994, now abandoned, which is a continuation of application No. 08/140,698, filed on Oct. 21, 1998, now abandoned, which is a continuation of application No. 07/918,163, filed on Jul. 21, 1992, now abandoned, which is a continuation of application No. 07/503,391, filed on Apr. 2, 1990, now abandoned.

(30) Foreign Application Priority Data

Apr. 26, 1989 (JP) .................................. 1-106838

(51) Int. Cl.$^7$ ................ B60C 9/18; B60C 13/02
(52) U.S. Cl. ................ 152/523; 152/526; 152/532; 152/538
(58) Field of Search .................. 152/454, 526, 152/532, 538, 523, 209.16

(56) References Cited

U.S. PATENT DOCUMENTS

| | | | |
|---|---|---|---|
| Re. 30,549 | * 3/1981 | Mirtain et al. | 152/538 X |
| 3,205,931 | * 9/1965 | Keefe, Jr. | 152/538 X |
| 3,244,213 | * 4/1966 | McMannis | 152/454 |
| 3,982,579 | * 9/1976 | Mirtain | 152/538 X |
| 3,990,493 | * 11/1976 | Caretta | 152/526 |
| 4,262,726 | * 4/1981 | Welter | 152/532 X |
| 4,282,918 | * 8/1981 | Tomoda et al. | 152/532 X |
| 4,446,905 | * 5/1984 | Tamura et al. | 152/536 X |
| 4,633,926 | * 1/1987 | Tamura | 152/538 X |
| 4,702,293 | * 10/1987 | Iwata et al. | 152/538 X |
| 4,716,951 | * 1/1988 | Suzuki et al. | 152/535 |

FOREIGN PATENT DOCUMENTS

| | | | |
|---|---|---|---|
| 0072500 | * 2/1983 | (EP) | 152/454 |
| 0973944 | * 11/1964 | (GB) | 152/538 |
| 2096073 | * 10/1982 | (GB) | 152/538 |
| 58126204 | * 7/1983 | (JP) | 152/538 |

* cited by examiner

*Primary Examiner*—Adrienne C. Johnstone
(74) *Attorney, Agent, or Firm*—Jordan and Hamburg LLP

(57) ABSTRACT

To assure a positive camber thrust for a radial-ply tire including a belt of four or more plies on a carcass with pad rubber interposed therebetween, the width of the outermost belt ply is increased over the width of the adjacent belt ply and the ratio of the difference found by subtracting the tread width from the maximum belt ply width to the difference between the maximum tire width and the tread width is not less than 0.1 and not more than 0.4.

10 Claims, 4 Drawing Sheets

RADIAL-PLY TIRE WITH SPECIFIED BELT STRUCTURE

This application is a continuation, of application Ser. No. 08/610,795 filed Mar. 11, 1996, now abandoned, which is a continuation of Ser. No. 08/355,411 filed Dec. 9, 1994, now abandoned, which is a continuation of application Ser. No. 08/140,698 filed Oct. 21, 1993, now abandoned, which is a continuation of application Ser. No. 07/918,163 filed Jul. 21, 1992, now abandoned, which is a continuation of application Ser. No. 07/503,391 filed Apr. 2, 1990, now abandoned.

BACKGROUND OF THE INVENTION

1. Technical Field

The present invention relates to a radial-ply tire having a belt consisting of 4 or more plies and disposed on a carcass with interposed rubber pads, and more particularly to a radial-ply tire improved in camber thrust characteristic.

2. Background Art

FIG. 3 is a schematic partial section view showing a conventional radial-ply truck/bus tire which is generally used at an inflation pressure not less than 4 kg/cm$^2$.

The circumferential surface of a carcass 10 is braced by a belt 20. This belt 20 consists of four plies 21, 22, 23 and 24. These belt plies may for example be rubber pads steel cords, with pad rubber 30 being interposed between the ends of these plies and the carcass 10. Of the four plies, the second ply 22 has the maximum width NBW, with the third and fourth plies 23, 24 having progressively diminishing widths. Furthermore, tread rubber 40 is laid on the belt 20. The width of this tread rubber 40, which means the tread width TW, is larger than the maximum belt width MBW.

In the conventional radial-ply tire described above, in which the widths of all the belt plies 21, 22, 23, 24 are smaller than the tread width TW, the tread stiffness shows a sudden decrease at the side edges of the tread rubber 40 so that when the tire has been caught in a rut, a negative camber thrust is generated, provided that the camber in the upward direction along the slope of the rut is taken as being the positive camber. Therefore, the problem arises that unless the steering wheel is turned much, the vehicle cannot be successfully dislodged from the rut.

With the foregoing in view, it is an object of the present invention to achieve a positive camber thrust with a radial-ply tire having a belt of 4 or more plies on a carcass through an interposed rubber pads.

SUMMARY OF THE INVENTION

The radial-ply tire of the present invention has a belt consisting of 4 or more plies between a carcass and a tread, the respective ends of the plies being kept isolated from the carcass by respective rubber pads interposed therebetween, the width TBW of the outermost belt ply being larger than the width NBW of the adjacent ply and the value of K given by the following equation being not less than 0.1 and not more than 0.4.

$$K = \frac{MBW - TW}{OW - TW}$$

where MBW is the maximum belt ply width, OW is the maximum tire width and TW is the tread width.

In this radial-ply tire, the tread portions disposed externally of the conventional belt region, that is to say, the side edges of the tread, have an increased stiffness to generate a positive camber thrust. Therefore, with this radial-ply tire, a vehicle can be easily dislodged from the rut with a large slope without turning the steering wheel through a large angle. If the value of K is less than 0.1, inclusive of the negative range, the value of camber thrust will be negative. If the value of K exceeds 0.4, difficulties will be encountered in the manufacture of the tire.

Furthermore, as the outermost belt ply width TBW is increased over the tread width TW, the ends of this outermost belt ply are disposed closer to side walls of tire shoulders so that not only strain of the belt ends due to loading is decreased but also the irregular wear of the tread ends is suppressed to thereby contribute to an increased tire durability.

Furthermore, as the side wall of the tire shoulder is elevated at an imaginary extension of the belt, the ends of all the belt plies adjoin a comparatively thick body of rubber so that the concentration of stresses at the ply ends is relieved by deformation of the rubber.

DETAILED DESCRIPTION OF THE PREFERRED EMBODIMENTS OF THE INVENTION

Figure 1A:
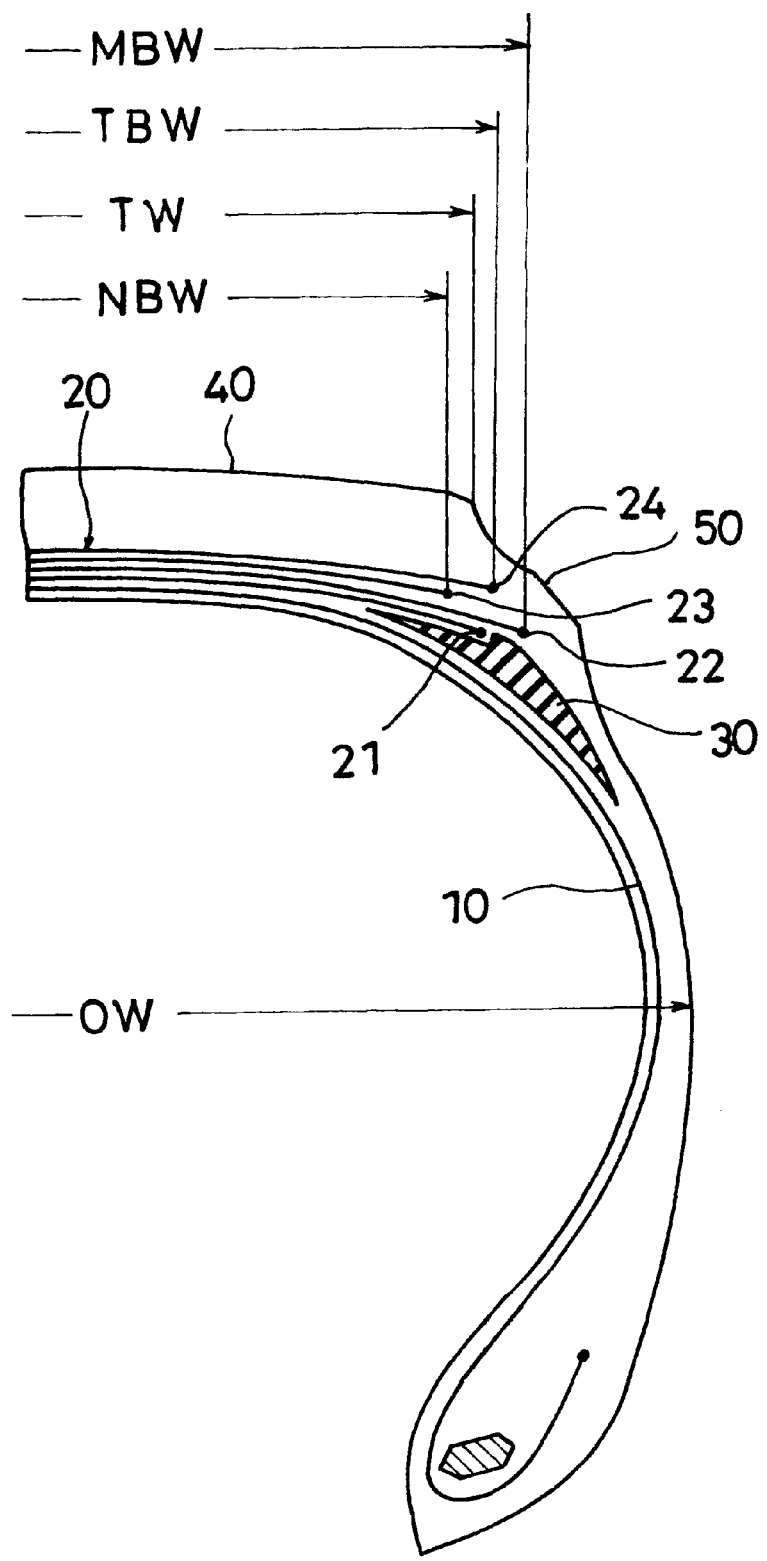
FIG. 1a is a schematic partial section view showing a radial-ply tire according to one embodiment of the invention.

FIG. 1a is a schematic partial section view showing the radial-ply tire according to one preferred embodiment of the invention. Like the tire described herein-before, this is also a tire for trucks and buses which is used at an inflation pressure not less than 4 kg/cm$^2$.

Figure 1B:
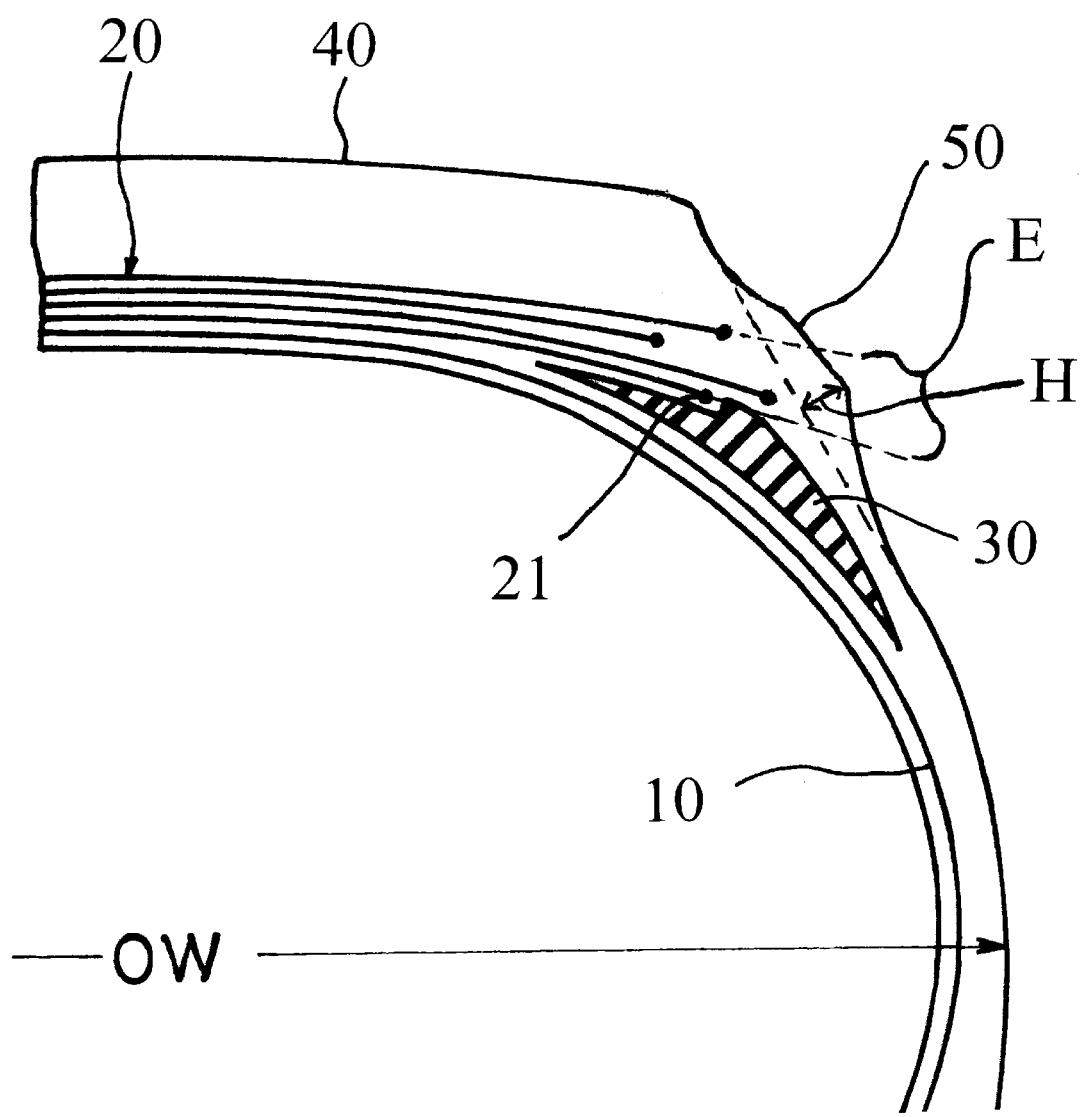
FIG. 1b is an enlargement of a portion of FIG. 1a showing a sidewall configuration.

In this embodiment, too, a belt 20 bracing the circumferential surface of a carcass 10 consists of 4 plies 21, 22, 23, 24. These belt plies may for example be rubber-topped steel cords and rubber pad 30 is interposed between the ends of these plies and the carcass 10. Instead of steel cords, aromatic polyamide (aramid) cords, each of which has relatively high Young's modulus, may be employed. Of these 4 plies, the second ply 22 has the largest width MBW and the width TBW of the fourth ply 24 is larger than the width NBW of the third ply 23. Furthermore, tread rubber 40 is laid on the belt 20. However, unlike the conventional tire construction, the width of this tread rubber 40, that is to say the tread width TW, is smaller than the width of the second ply 22, i.e. the maximum width MBW of the belt, and also smaller than the width of the fourth ply 24, i.e. the outermost belt ply width TBW. Furthermore, the value of K given by the equation $$K = \frac{MBW - TW}{OW - TW}$$

where OW is the maximum width of the tire is not less than 0.1 and not more than 0.4. It should be understood that all the dimensions, such as MBW represent, linear distances as illustrated. Furthermore, in this embodiment, near an imaginary extension E of the belt 20 and on the side wall of the shoulder portion, an elevation 50 having a height H of 3 to 20 mm is provided as shown in FIG. 1*b*.

In the radial-ply tire according to the above embodiment, the ends of all the plies 21, 22, 23, 24 are kept isolated from the carcass 10 by the interposed rubber pad 30 so as to prevent concentration of stresses at the ends of the plies. Furthermore, as the width TBW of the fourth ply 24 is increased over the tread width TW to thereby provide a distance between the end of this ply and the tread end, the end of the fourth ply 24 is hardly subject to the influence of the stress generated on contact of the tread with the ground surface so that the strain of the belt end under loading is minimized. Moreover, as the ends of this fourth ply 24 are disposed closer to the shoulder side walls than they are in the conventional tire, the dissipation of heat is encouraged. Generally speaking, the end of the ply reinforced by a bias cord is weak in self-bracing power because the ply is terminated there. In addition, the fourth ply 24 which is located outermost is not supported by other plies. Therefore, the end of the fourth ply 24 tends to be relatively mobile. However, in the radial-ply tire of this embodiment, it is not the mobile end of the fourth ply 24 but the inner less-mobile portion thereof that is located below the tread end, with the result that the tread end is less movable and hence irregular wear is suppressed. Furthermore, since the surface of the side wall of the tire shoulder is raised near the imaginary extension E of the belt 20 as indicated by the reference numeral 50, the ends of the second and fourth plies 22, 24 adjoin a comparatively thick body of rubber so that the stress concentration at the ends of these plies 22, 24 is relieved. The height of the elevation 50 is 3 to 20 mm and preferably 3 to 15 mm. If the height of elevation 50 is less than 3 mm, its dispersing effect on stress concentration at the ply ends will not be sufficient. If the height is increased beyond 20 mm, the intention to prevent temperature buildup by disposing the ply ends closer to the side wall of the shoulder will not be fully realized. The optimum height depends on the heat-generating potential of the rubber constituting this elevation 50. Moreover, the tread stiffness of the tread rubber 40 is equalized to yield a positive camber thrust as explained below.

Figure 2:
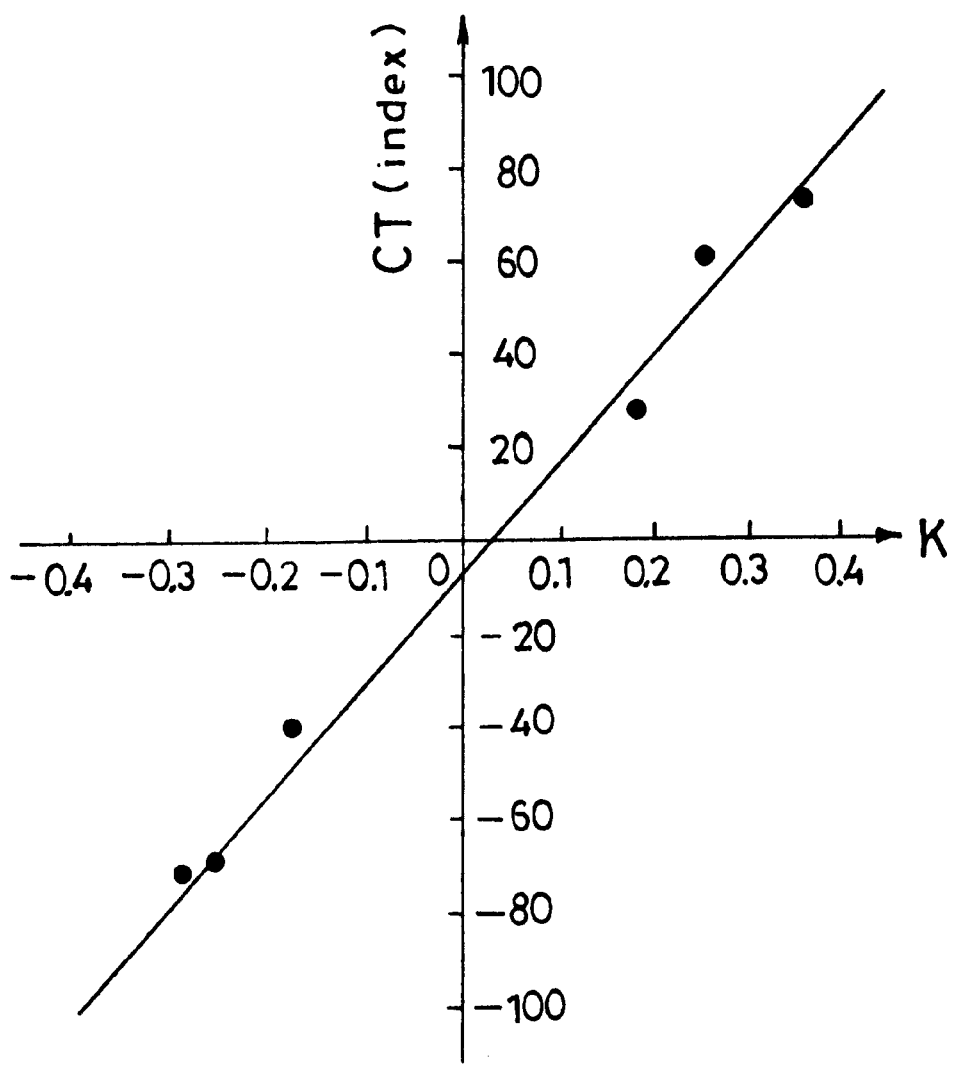
FIG. 2 is a diagrammatic representation of the camber thrust generated in the radial-ply tire of the same embodiment versus the camber thrust generated in the conventional radial-ply tire.
Figure 3:
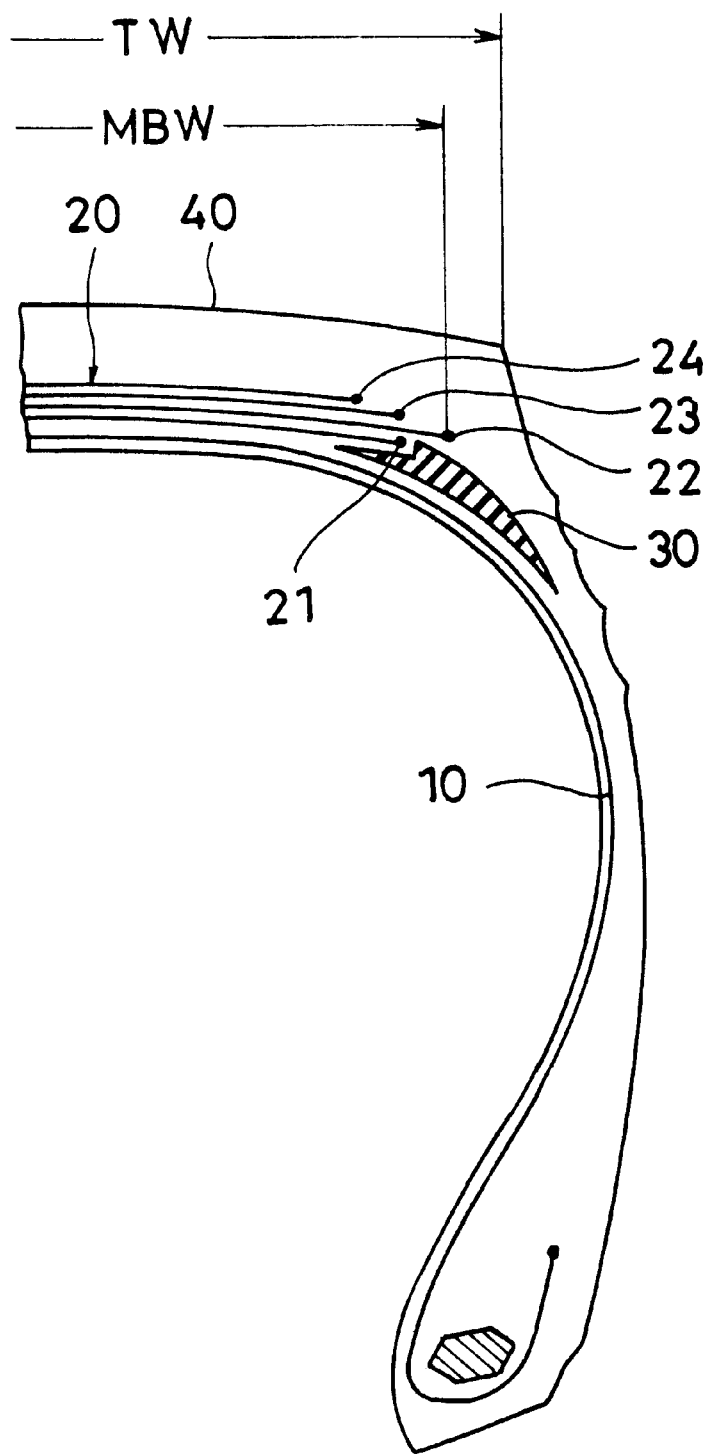
FIG. 3 is a schematic partial section view showing a conventional radial-ply tire.

FIG. 2 is a diagrammatic representation of the relationship of the K values of radial-ply tires having various steel cord belt widths with the values of camber thrust CT generated in the respective tires. It should be understood that the camber thrust CT values were measured with the camber angle being set at 8 degrees for 11R22.5 14PR tubeless tires.

As apparent from the same view, while the CT value is negative when K is negative, a positive camber thrust CT value is obtained when K is not less than 0.1 and not more than 0.4. Therefore, when the radial-ply tire of the invention is employed, the vehicle can be easily dislodged from a rut with a large angle of inclination without turning the steering wheel through a large angle.

It should be understood that the invention is not only applicable to the 4-ply construction described hereinbefore but also applicable generally to radial-ply tires having more than 4 plies on the carcass with interposed rubber pads and that the invention is also applicable to tires for light-duty trucks in addition to the above-described tires for trucks and buses.

What is claimed is:

1. A radial-ply tire comprising:

a carcass with a tread provided over the carcass;

a belt including four or more belt plies interposed between said carcass and said tread, said belt plies having edge ends between which widths of said belt plies are defined;

rubber pads interposed between said edge ends and said carcass for isolating said edge ends of said belt plies from said carcass;

said belt plies including an outermost belt ply having an outermost belt ply width TBW and an adjacent ply having a width NBW wherein TBW is greater than NBW;

a parameter K having a value not less than 0.1 and not more than 0.4, wherein K is defined by the following equation $$K = \frac{MBW - TW}{OW - TW}$$

where MBW is a maximum belt ply width of said belt plies, OW is a maximum tire width of the radial ply tire, said tread has a tread width TW, MBW is greater than TW, TBW is greater than TW, and NBW is less than TW.

2. The radial-ply tire of claim 1, wherein the tire has a shoulder having a side wall provided with a raised portion about an imaginary extension of the belt intersecting the side wall.

3. The radial ply tire of claim 1, wherein the ply of the width MBW is below and adjacent the belt ply of the width NBW.

4. The radial ply tire of claim 1, wherein the belt consists of four belt plies.

5. The radial ply tire of claim 2, wherein the height of the raised portion extends to between 3 and 20 mm extending normally from a substantially straight virtual boundary extending from an outer circumferential edge of the raised portion to an inner circumferential edge of the raised portion.

6. The radial ply tire of claim 5, wherein the belt ply of the width MBW is below and adjacent the belt ply of the width NBW.

7. The radial ply tire of claim 6, wherein the belt consists of four belt plies.

8. The radial ply tire of claim 5, wherein the height of the raised portion extends to between 3 and 15 mm.

9. The radial ply tire of claim 8, wherein the belt ply of the width MBW is below and adjacent the belt ply of the width NBW.

10. The radial ply tire of claim 9, wherein the belt consists of four belt plies.

* * * * *